3,154,408
Patented Oct. 27, 1964

3,154,408
URANIUM RECOVERY FROM ORE
CONCENTRATES
James B. Knighton, Joliet, Robert K. Steunenberg, Naperville, and Joseph P. La Plante, Palos Park, Ill., assignors to the United States of America as represented by the United States Atomic Energy Commission
No Drawing. Filed Apr. 8, 1963, Ser. No. 271,528
13 Claims. (Cl. 75—84.1)

The process of this invention deals with the recovery of uranium metal from oxidic uranium materials, such as they are obtained by the processing of uranium ores.

The invention is primarily intended for so-called uranium concentrates which are obtained by leaching uranium-containing ores and processing the leach solutions by known methods; the uranium values are then recovered in solid form, for instance by precipitation.

The uranium ore concentrates primarily consist of a mixture of uranium oxides and mono- and diuranates of alkali metals, ammonium, alkaline earth metals and other contaminating ions. The total uranium content, expressed as $U_3O_8$, usually is about 83% by weight. The contaminant ions other than those of alkali metals, alkaline earth metals and ammonium present in ore concentrates are aluminum, boron, iron, chromium, magnesium, molybdenum and/or nickel. Quite frequently the concentrates also contain silicon.

Heretofore the uranium of such ore concentrates, after chemical purification, has been converted to $U_3O_8$. Then the $U_3O_8$ has been reduced with hydrogen to produce $UO_2$ and the $UO_2$ has been contacted with hydrogen fluoride to form uranium tetrafluoride. The uranium tetrafluoride has then been subjected to a reduction step in an autoclave with calcium or magnesium metal, the so-called bomb process.

This process is rather complicated and expensive, since it requires a great many steps. It also necessitates the use of different equipment for different steps, for instance an autoclave for the bomb reduction; the transfer of the reaction mixtures from one container to another always entails a certain loss of material.

It is an object of this invention to provide a process for the purification and reduction of the uranium-containing compounds of ore concentrates by a simple pyrometallurgical procedure.

It is another object of this invention to provide a process for the purification and reduction of the uranium-containing compounds of ore concentrates which requires only a few steps, all of which can be carried out in one and the same crucible.

It is finally also an object of this invention to provide a process for the purification and reduction of the uranium-containing compounds of ore concentrates by which a uranium metal of an especially high degree of purity is obtained.

It was found that, when magnesium chloride is added to a uranium-containing ore concentrate, the magnesium chloride is melted and the reaction mixture is stirred while in contact with air, magnesium chloride reacts and produces magnesium oxide and chlorine. The chlorine also reacts with some contaminants and forms chlorides. Some of the chlorides formed, such as aluminum chloride, boron chloride, ferric chloride, chromium chloride, molybdenum chloride and nickel chloride, are volatile at the melting temperature and are removed in this step, leaving a partly purified uranium-containing mixture. Some of the magnesium chloride reacts as such with the ore concentrate without decomposition to elemental chlorine; it converts alkali metal, alkaline earth metal and ammonium uranates to magnesium uranate, and it also reacts with uranium oxides and forms magnesium uranate; magnesium uranate is reduced more easily by magnesium metal than are uranium oxides.

The magnesium chloride thus has a multiplicity of functions: (1) it gives off chlorine which reacts with some contaminants and removes them as volatile chlorides; (2) it reacts with the alkali metal, alkaline earth metal and with ammonium uranates to form easily reducible magnesium uranate; and (3) it reacts with $U_3O_8$ and thereby forms magnesium uranate. Apart from this novel and unexpected combination of these three functions, magnesium chloride also has a beneficial effect by protecting the metal phase from oxidation. Furthermore, it acts as a dispersing medium for the ore concentrates. Finally, it takes up the non-volatile contaminants, such as alkali metal, alkaline earth metal, and rare earth metal compounds and magnesium oxide formed, and thus removes these compounds from the metal phase.

It was furthermore found that, if magnesium metal is added, preferably in the form of a magnesium-zinc alloy, to the molten reaction mixture after reaction with magnesium chloride plus air, the uranium compounds are selectively reduced to the metal. As a consequence, the uranium metal is collected in the remaining metal, while the contaminants that were not volatilized at the chlorination temperature are retained in the magnesium-chloride-containing salt or flux phase.

One embodiment of the process of this invention thus comprises adding a magnesium-chloride-containing flux to the ore concentrate to be treated; heating the reaction mixture to between 600 and 900° C. and agitating the mixture while in contact with air, whereby some of the contaminants are chlorinated and volatilized; adding a magnesium-zinc alloy in which the magnesium is present in a quantity excessive of that stoichiometrically required, while maintaining the temperature at between 600 and 900° C., whereby uranium compounds are reduced to uranium metal which is taken up by the alloy; and separating a contaminants-containing flux phase from the uranium-containing alloy.

The invention also comprises an embodiment that includes a pretreatment for the removal of any silicon present in the concentrate; the above-outlined process then follows such a pretreatment. While a number of means are available for the removal of silicon, such as reaction with hydrogen fluoride, the inventors preferred to add ammonium bifluoride, $NH_4HF_2$, and to heat the mixture obtained, whereby the silicon is converted to silicon tetrafluoride and/or other volatile fluorine-containing silicon compounds and is evaporated as such. The effect of quantity of ammonium bifluoride and that of changes of temperature on silicon removal were studied. For the former purpose, samples of about 2 grams were mixed with varying quantities of ammonium bifluoride, and the mixtures thus obtained were heated for 4 hours at 145° C. in the air. The results are compiled in Table I.

TABLE I

| $NH_4HF_2$/concentrate: | Percent Si removed |
|---|---|
| .047 | 0 |
| .052 | 22.3 |
| .062 | 17.7 |
| .124 | 67.3 |
| .150 | 86.3 |
| .259 | 87.3 |
| .380 | 90.2 |
| .404 | 88.4 |

The data of Table I show that at least 0.15 part by weight of ammonium bifluoride should be used per one part by weight of ore concentrate.

In order to determine the effect of temperature on the volatilization of silica, a 1-gram sample of $SiO_2$ (beach sand) was mixed with 3.8 grams of $NH_4HF_2$ which was an excess of 100% of the bifluoride. The reaction was carried out in a platinum crucible in air for 3 hours at different temperatures. The results are shown in Table II.

TABLE II

| Temperature: | Percent $SiO_2$ volatilized |
|---|---|
| 100° C. | 14 |
| 125° C. | 97 |
| 150° C. | 99 |
| 175° C. | 90 |
| 225° C. | 72 |
| 350° C. | 35 |

The above results show that best results are obtained at temperatures between 125 and 150° C.

Magnesium chloride is the essential, reacting component of the flux to be added for the chlorination of some of the impurities present in the ore concentrate. However, in order to reduce cost, the magnesium chloride is preferably diluted by adding a certain amount of the less expensive calcium chloride and/or sodium chloride and/or potassium chloride; calcium chloride and sodium chloride are preferred to potassium chloride. The magnesium content should, however, be at least 10 atom percent of the cation content of the flux, and preferably between 15 and 60 atom percent, and in any case it should be excessive of the amount necessary for the chlorination of all the cations present. A further improvement of the flux is obtained by adding a small percentage, say from about 2 to 20 mole percent, of magnesium fluoride or calcium fluoride. A mixture of 47.5 mole percent of magnesium chloride, 47.5 mole percent of calcium chloride and 5 mole percent of magnesium fluoride was found to be a satisfactory composition.

As has been mentioned before, the mixture is heated to between 600 and 900° C., the exact temperature depending on the composition of the flux; a temperature of about 800° C. is satisfactory for most flux compositions. The mixture is agitated while in contact with air. An hour usually is sufficient for this step. After this, magnesium-zinc alloy is added for the reduction of the uranium compounds present. The magnesium-zinc alloy may contain any quantity of magnesium above 3% by weight, but preferably from 3 to 50%. The very best results were obtained with a magnesium content of between 3 and 15% by weight. The total amount of zinc added should be such that the density of the alloy is greater than that of the flux, so that easy and quantitative phase separation is possible. Also in this step, the temperature should range between 600 and 900° C., but preferably between 750 and 800° C. The reduction reaction proceeds rather fast and is usually completed in about 20 minutes at a temperature of about 800° C.

After completed reduction, the metal and salt phases are separated from each other. This can be done by means known to those skilled in the art, for example by decantation or mechanical separation after solidification of both phases.

Equipment found suitable for carrying out the process of this invention was an alumina crucible and a motor-driven quartz stirrer.

The separated uranium-magnesium-zinc alloy is treated for removal of zinc and magnesium. For this purpose, the alloy is retorted in a vacuum or in an atmosphere of argon or other inert gas at about 900° C.; at this temperature both zinc and magnesium are volatile. The zinc and magnesium can be condensed together and can be recycled into the process. In fact, by recycling of the zinc, the introduction of new quantities of the usual zinc contaminants, such as iron, copper and silver, is avoided.

After retorting, the uranium metal is remelted to obtain a solid, sound ingot. This can be done by various methods known to those skilled in the art. While arc-melting, for instance, is suitable, induction- or resistance-melting are preferred, because there, too, transfer of the metal to another container is not necessary. Thus, the preferred method is induction- or resistance-melting in situ either in a vacuum or in an inert atmosphere.

In the following, two examples are given for illustrative purposes.

*Example I*

To 41.7318 grams of uranium ore concentrate containing 29.0 grams of uranium there was added 15.2360 grams of ammonium bifluoride; the mixture was heated in air to 150° C. and held there for 4 hours and then at 600° C. for 30 minutes to fume off the excess of ammonium bifluoride.

Thereafter a mixture of magnesium chloride and magnesium fluoride (290 grams–10 grams) was added. The mixture was heated to 800° C. and stirred with a quartz paddle at 600 r.p.m. in an atmosphere of air for two hours.

After this, the reaction mass was cooled and transferred to a tantalum crucible from the alumina crucible used for the chlorination step. The mass transferred weighed 299.5 grams; a small amount of the charge was lost due to adherence to the alumina crucible. High-purity zinc and high-purity magnesium, 540 and 60 grams, respectively, were then added, and the temperature was again raised to 800° C. This reduction step was carried out in an argon atmosphere; the content of the crucible was transferred into a graphite mold and allowed to cool there for solidification. Also here, adherence of uranium-zinc-magnesium alloy to the tantalum crucible caused a slight loss. The phases were broken apart.

The metal layer was retorted at 900° C. in an argon atmosphere, whereby magnesium and zinc distilled off, and the remaining uranium sponge was then arc-melted in an atmosphere of argon plus helium. The yield of uranium was 88%, which was low due to the above-described losses. If these losses had not occurred, the yield would have been about 99%.

Of course, the relative losses are much lower in large-scale operations; furthermore, by using the same equipment repeatedly for a number of runs, the losses are restricted to the first run.

The metal obtained was analyzed. In Table III the contents of contaminants, all expressed in parts per million, of the ore concentrate used and of the uranium metal obtained are juxtaposed.

TABLE III

| Element | Concentrate | Uranium Metal |
|---|---|---|
| Ag | <10 | <1 |
| Al | 500 | <10 |
| As | <100 | <20 |
| B | 20 | 2 |
| Be | <5 | <.5 |
| Bi | <100 | <2 |
| Ca | 1,000 | <100 |
| Co | <100 | <5 |
| Cr | <200 | 10 |
| Cu | 2 | 3 |
| Fe | 500 | 100 |
| K | 1,000 | <50 |
| Li | <100 | <5 |
| Mg | 2,000 | 1 |
| Mn | 1,000 | 150 |
| Mo | 5 | 20 |
| Na | 3,000 | <5 |
| Ni | 5 | 15 |
| P | <200 | |
| Pb | 10 | <1 |
| Sb | <100 | <5 |
| Si | 108,000 | 170 |
| Sn | <100 | <5 |
| Sr | 100 | |
| Ti | <1,000 | <50 |
| Zn | <100 | <50 |

Table III shows that most contaminating elements were removed to a great degree and that a uranium of high purity was thus obtained.

Example II

In this example purification values are compared that were obtained (a) by "direct reduction" and (b) by one embodiment of this invention. For direct reduction the flux and the zinc-magnesium alloy were simultaneously added. The flux consisted of 104.4 grams of $CaCl_2$, 89.4 grams of $MgCl_2$ and 6.2 grams of $MgF_2$; the reducing alloy contained 380 grams of zinc and 20 grams of magnesium. These were added to 29.7 grams of ore concentrate. The mixture was held at 800° C. for one hour while it was stirred at 800 r.p.m.

For the process of the invention, the flux-concentrate mixture was melted and agitated while in contact with air prior to the addition of the zinc-magnesium alloy. The compositions and quantities of ore concentrate, flux and reducing alloy and the temperature were the same here as in the direct reduction.

The metals of both runs were retorted in vacuum, and the uranium sponge obtained thereby was remelted. In Table IV the contents of contaminants of the two uranium products are given in parts per million of uranium.

TABLE IV

| Contaminating Element | P.p.m. Present in U after Direct Reduction | P.p.m. Present in U Obtained by Invention |
|---|---|---|
| Al | 150 | 40 |
| B | 100 | 50 |
| Cr | 30 | 3 |
| Fe | 300 | 20 |
| Mn | 1,000 | 500 |
| Mo | 5 | <5 |
| V | 100 | 80 |
| Zr | <80 | <20 |

This table clearly shows the superiority of this process to the direct reduction process.

It will be understood that the invention is not to be limited to the details given herein but that it may be modified within the scope of the appended claims.

What is claimed is:

1. A process of recovering pure uranium metal from oxidic ore concentrates containing uranium and contaminants, comprising adding a magnesium-chloride-containing flux containing from 2 to 20 mole percent of a fluoride selected from the group consisting of calcium fluoride and magnesium fluoride and the magnesium content is at least 10 atom percent of the total cation content to the concentrate; heating the mixture obtained to between 600 and 900° C. and at the same time agitating it while in contact with air for a sufficient period of time that contaminants are chlorinated and the chlorides formed of the contaminants that are volatile at said temperature are volatilized; adding magnesium-zinc alloy in a quantity excessive of that stoichiometrically required for the reduction of all uranium compounds present, while maintaining the temperature at between 600 and 900° C., whereby uranium compounds are reduced to uranium metal and the latter is taken up by the excess of magnesium-zinc alloy; and separating a contaminants-containing flux phase from the uranium-containing alloy.

2. The process of claim 1 wherein the flux also comprises a chloride selected from the group consisting of calcium chloride, potassium chloride and sodium chloride.

3. The process of claim 2 wherein the magnesium cation content of the flux is from 15 to 60 atom percent.

4. The process of claim 2 wherein the flux consists of 47.5 mole percent of magnesium chloride, 47.5% mole percent of calcium chloride and 5 mole percent of magnesium fluoride, and the concentrate-flux mixture is heated to about 800° C.

5. The process of claim 1 wherein the magnesium content of the zinc alloy is at least about 3% by weight.

6. The process of claim 5 wherein the magnesium-zinc alloy contains from 3 to 50% by weight of magnesium.

7. The process of claim 6 wherein the alloy contains from 3 to 15% by weight of magnesium, and the reduction temperature ranges between 750 and 800° C.

8. The process of claim 1 wherein the uranium-containing alloy is retorted in an inert atmosphere at about 900° C., whereby magnesium and zinc are volatilized and uranium metal is obtained; said uranium metal is melted in an inert atmosphere and then cooled, whereby pure uranium metal solidifies in the form of an ingot.

9. The process of claim 8 wherein retorting and melting are done by induction-heating.

10. The process of claim 8 wherein retorting and melting are effected by resistance-heating.

11. A process of recovering pure uranium metal from oxidic ore concentrates containing uranium and contaminants, comprising adding a flux consisting of about 47.5 mole percent of magnesium chloride, 47.5 mole percent of calcium chloride and 5 mole percent of magnesium fluoride to said concentrate; heating the mixture obtained to about 800° C. and at the same time agitating it while in contact with air for about one hour, whereby the contaminants are chlorinated and the chlorides formed of the contaminants that are volatile at said temperature are volatilized; adding a magnesium-zinc alloy containing from 3 to 15% by weight of magnesium in a quantity to furnish magnesium in excess of that stoichiometrically required for the reduction of all uranium compounds present, while maintaining the temperature at between 750 and 800° C., whereby uranium compounds are reduced to uranium metal and the latter is taken up by the excess of magnesium-zinc alloy; separating a contaminants-containing flux phase from the uranium-containing alloy; heating the uranium-containing alloy at about 900° C. in a vacuum, whereby magnesium and zinc are volatilized and uranium metal remains; and remelting said uranium metal in an inert atmosphere, whereby a solid uranium ingot of a high degree of purity is obtained.

12. A process of recovering pure uranium metal from oxidic ore concentrates containing uranium and contaminants, comprising adding ammonium bifluoride to said concentrate; heating the mixture thus obtained to from 125 to 150° C., whereby any silicon present is volatilized in the form of fluoride-containing compounds; adding a magnesium-chloride-containing flux to the concentrate; heating the mixture obtained to between 600 and 900° C. and at the same time agitating it while in contact with air, whereby contaminants are chlorinated and some of the chlorides formed of the contaminants are volatilized; adding magnesium-zinc alloy in a quantity excessive of that stoichiometrically required for the reduction of all uranium compounds present, while maintaining the temperature at between 600 and 900° C., whereby uranium compounds are reduced to uranium metal and the latter is taken up by the excess of magnesium-zinc alloy; and separating a contaminants-containing flux phase from the uranium-containing alloy.

13. The process of claim 12 wherein the ammonium bifluoride is added in a quantity above about 0.14 part by weight per one part by weight of ore concentrate.

References Cited in the file of this patent

UNITED STATES PATENTS

| | | |
|---|---|---|
| 1,659,209 | Marden | Feb. 14, 1928 |
| 1,738,669 | Rich | Dec. 10, 1929 |
| 2,926,082 | Whaley | Feb. 23, 1960 |
| 3,063,830 | Martin et al. | Nov. 13, 1962 |
| 3,109,731 | Knighton | Nov. 5, 1963 |